(12) United States Patent
Faedo et al.

(10) Patent No.: US 12,683,471 B2
(45) Date of Patent: Jul. 14, 2026

(54) ROTOR INTERLOCKING ELEMENTS AND METHOD FOR THEIR MANUFACTURING

(71) Applicant: DANA TM4 ITALIA S.R.L., Arzignano (IT)

(72) Inventors: Walter Faedo, Vestenanova (IT); Pierpaolo Zulpo, Arzignano (IT)

(73) Assignee: DANA TM4 ITALIA S.R.L., Arzignano (IT)

( * ) Notice: Subject to any disclaimer, the term of this patent is extended or adjusted under 35 U.S.C. 154(b) by 291 days.

(21) Appl. No.: 18/356,859

(22) Filed: Jul. 21, 2023

(65) Prior Publication Data

US 2025/0030322 A1     Jan. 23, 2025

(51) Int. Cl.
H02K 15/03          (2025.01)
H02K 15/12          (2006.01)

(52) U.S. Cl.
CPC ............. H02K 15/03 (2013.01); H02K 15/12 (2013.01); H02K 2201/09 (2013.01)

(58) Field of Classification Search
CPC .... H02K 15/03; H02K 15/12; H02K 2201/09; H02K 1/276; H02K 15/021; H02K 15/035; H02K 19/103; H02K 1/246
See application file for complete search history.

(56) References Cited

U.S. PATENT DOCUMENTS

| | | | |
|---|---|---|---|
| 4,916,346 A | 4/1990 | Kliman | |
| 4,916,960 A | 4/1990 | Inui et al. | |
| 2013/0026872 A1* | 1/2013 | Cirani | H02K 1/2766 |
| | | | 310/156.08 |
| 2021/0099041 A1* | 4/2021 | Sun | H02K 3/42 |

* cited by examiner

*Primary Examiner* — Thomas Truong
(74) *Attorney, Agent, or Firm* — McCoy Russell LLP

(57)          ABSTRACT

Methods and systems are disclosed for reducing ripple torque associated with internal bridges arranged within one or more barriers of a rotor lamination stack and increasing mechanical strength when the rotor lamination stack is configured without internal bridges. In one example, a rotor lamination stack includes at least one interlocking element arranged in one or more barriers. In another example, the at least one interlocking elements may be fabricated individually and independent of the rotor lamination stack or by employing the rotor lamination stack as a mold.

5 Claims, 9 Drawing Sheets

ROTOR INTERLOCKING ELEMENTS AND METHOD FOR THEIR MANUFACTURING

TECHNICAL FIELD

The present disclosure relates generally to systems and methods for electric motors, and more specifically to synchronous reluctance motors and permanent magnet assisted synchronous reluctance motors.

BACKGROUND AND SUMMARY

A magnetic design of a rotor of synchronous reluctance motors (SynRM) and permanent magnet assisted synchronous reluctance motors (PMASynRM) may include structural magnetic anisotropy and may be configured with regions of high reluctance and low reluctance. More specifically, the rotor may be formed by an assembly of disks called laminations that are adjacent along an axis of rotation of the rotor. Each lamination may be fabricated with a magnetically conductive material, such as iron or steel, and may have a magnetic structure that is divided into polar sectors that define the number of magnetic poles. Each sector has a minimum reluctance direction (e.g., "d" or direct axis) and a maximum reluctance direction (e.g., "q" or quadrature axis).

Rotor reluctance depends on empty regions of the lamination that comprise magnetically insulating materials, such as air. The empty regions, henceforth called barriers, may create magnetic barriers where magnetic flux encounters high resistance (e.g., high reluctance) that may hinder flow of the magnetic field. One or more internal bridges may be positioned in the center of the barriers to reduce mechanical stresses introduced by the barriers in existing motor systems. Each rotor lamination is constructed with the one or more internal bridges and since the laminations are fabricated using electrical steel with high permeability, the one or more internal bridges create a low reluctance closing path with a high concentration of magnetic field lines for the magnetic flux.

When a current is supplied to the stator windings, a magnetic field is generated. In response, the rotor aligns the d-axis (e.g., the magnetically conductive axis) with the magnetic field to minimize the reluctance through the magnetic circuit and reduce the magnetic conductance of the motor circuit. However, due to the presence of the internal bridges, the performance of synchronous reluctance motors (SynRM) and permanent magnet assisted synchronous reluctance motors (PMASynRM) may be reduced due to high ripple torque while operating at high speeds and low speeds.

In U.S. Pat. No. 4,916,346, Kilman et al. disclose a rotor system configuration to increase rotor strength, speed capability, and increase specific torque. The system includes laminations that include a magnetic portion comprising a plurality of pole pieces that extend radially outward from a core portion of the rotor system, forming a plurality of interpole spaces and a non-magnetic portion comprising non-magnetic segments between the pole pieces. Additionally, the non-magnetic segment may be wedge-shaped with a gap between the non-magnetic segment and the interior core. Non-magnetic segments of different sizes and shapes may be implemented in other rotor system configurations wherein the non-magnetic segments are bonded to adjacent edges of pole pieces to replace bridges and ligaments that increase the strength of the rotor. The non-magnetic segments are arranged to mitigate complex welding paths during fabrication of the rotor.

The disclosure discussed above relies on a configuration of the rotor and the rotor magnets with a design to mitigate complex welding paths. However, simple designs of the rotor may result in reduced torque production when compared with more complex designs that strategically leverage regions of high magnetic reluctance and low magnetic reluctance to achieve desired torque production.

The inventors herein have recognized the above issues and provide approaches to at least partially address them, including a rotor lamination stack comprising at least one interlocking element arranged in one or more barriers, the at least one interlocking element being non-metallic and non-magnetic. In this way, the disclosure may strategically leverage regions of high magnetic reluctance and low magnetic reluctance to achieve desired torque production without experiencing the same magnitude of torque ripple associated with rotor lamination stack with bridges and mechanical weakening associated with rotor lamination stacks without bridges.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

The methods and systems described herein relate to a rotor structure for decreasing ripple torque of an electric motor of a vehicle, specifically synchronous reluctance motors (SynRM) and a permanent magnet assisted synchronous reluctance motors (PMASynRM) by removing bridges of the rotor and including interlocking elements. In particular, systems and methods are provided for manufacturing the interlocking elements and configuring a rotor lamination stack with the interlocking elements. In this way, the efficiency of the motor may increase due to a reduction in ripple torque of the disclosed rotor lamination stack configuration.

Figure 1:
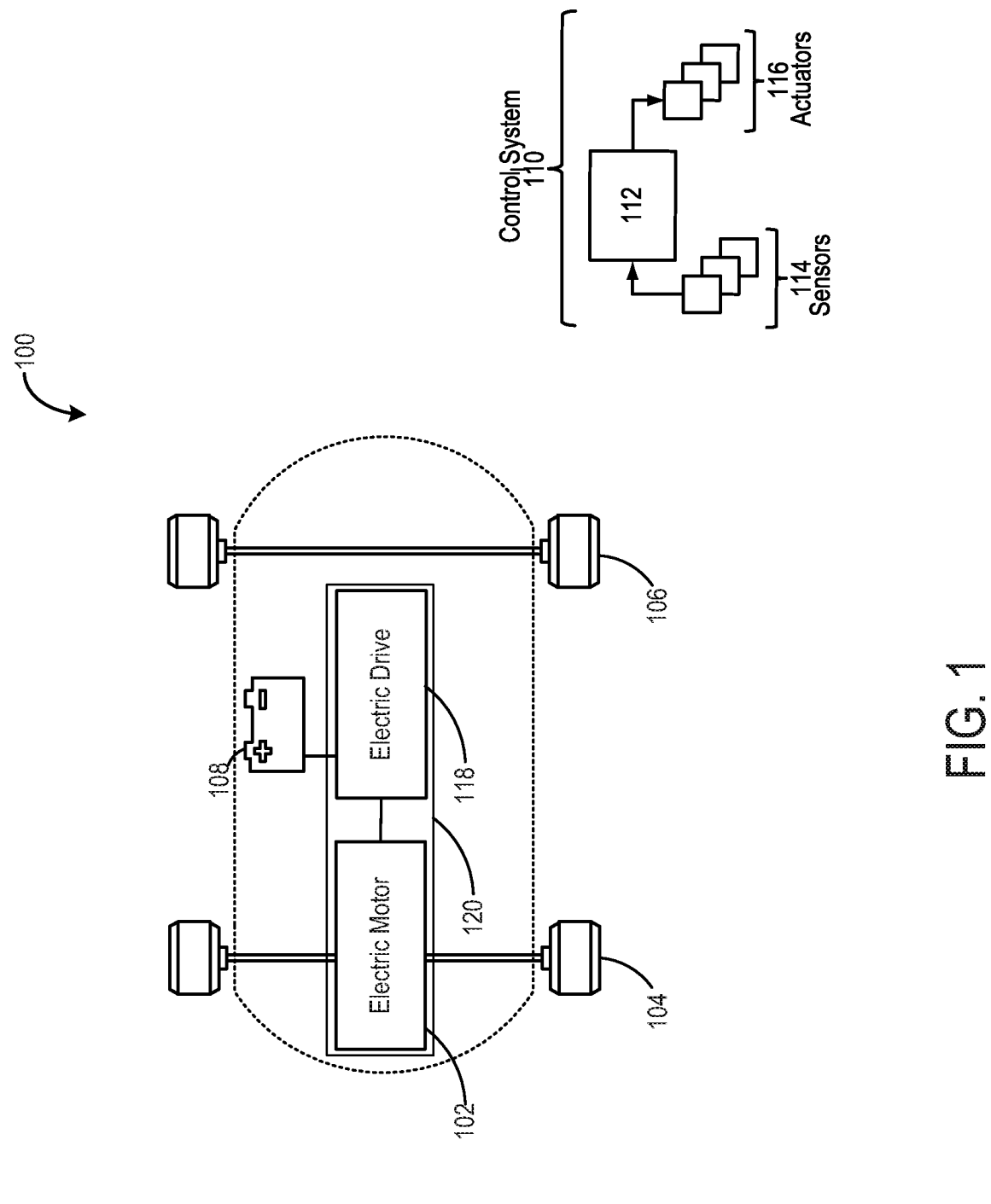
FIG. 1 illustrates a schematic of a vehicle including an electric motor.
Figure 2:
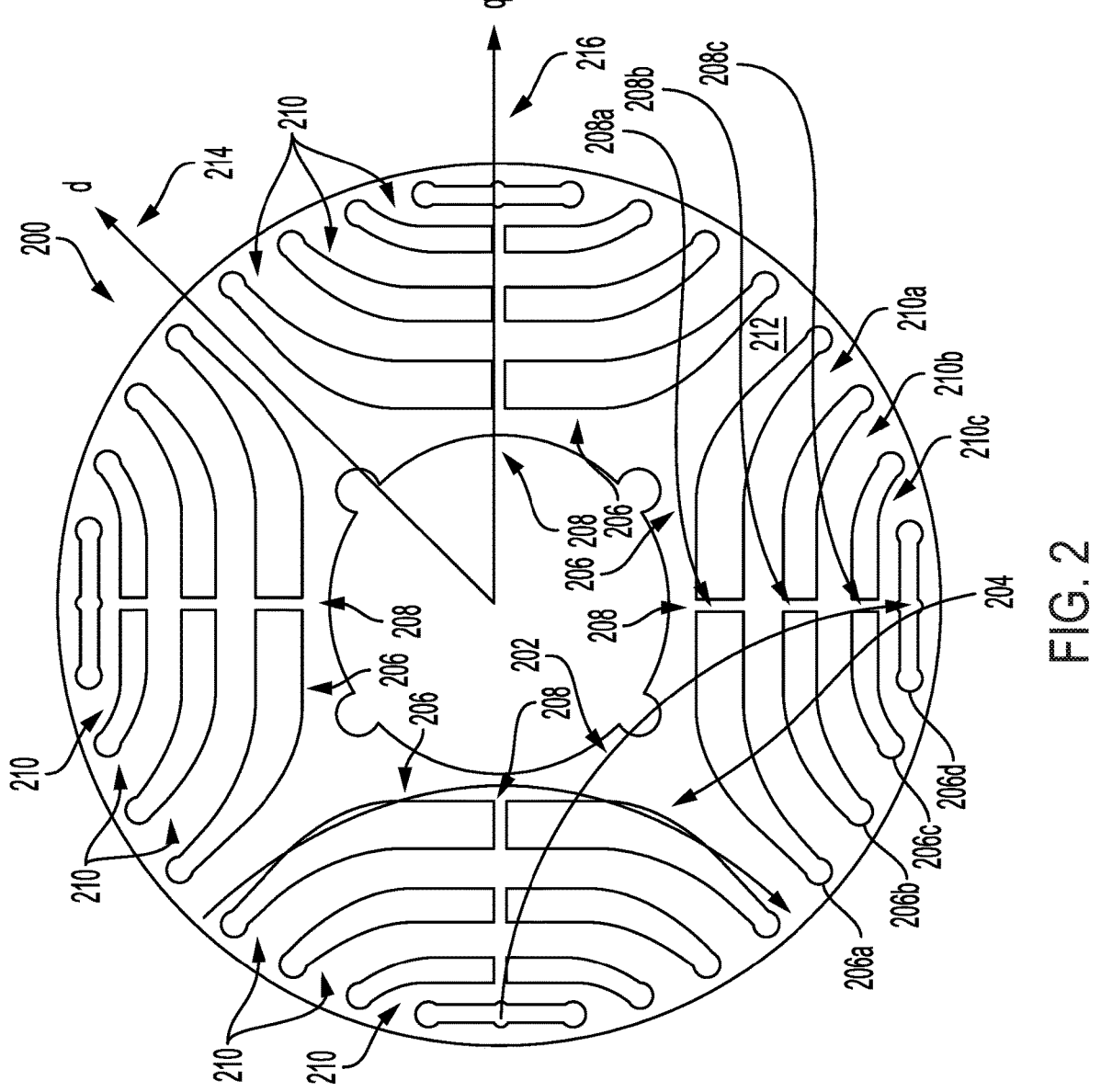
FIG. 2 illustrates a rotor lamination stack with bridges of an electric motor.
Figure 3A:
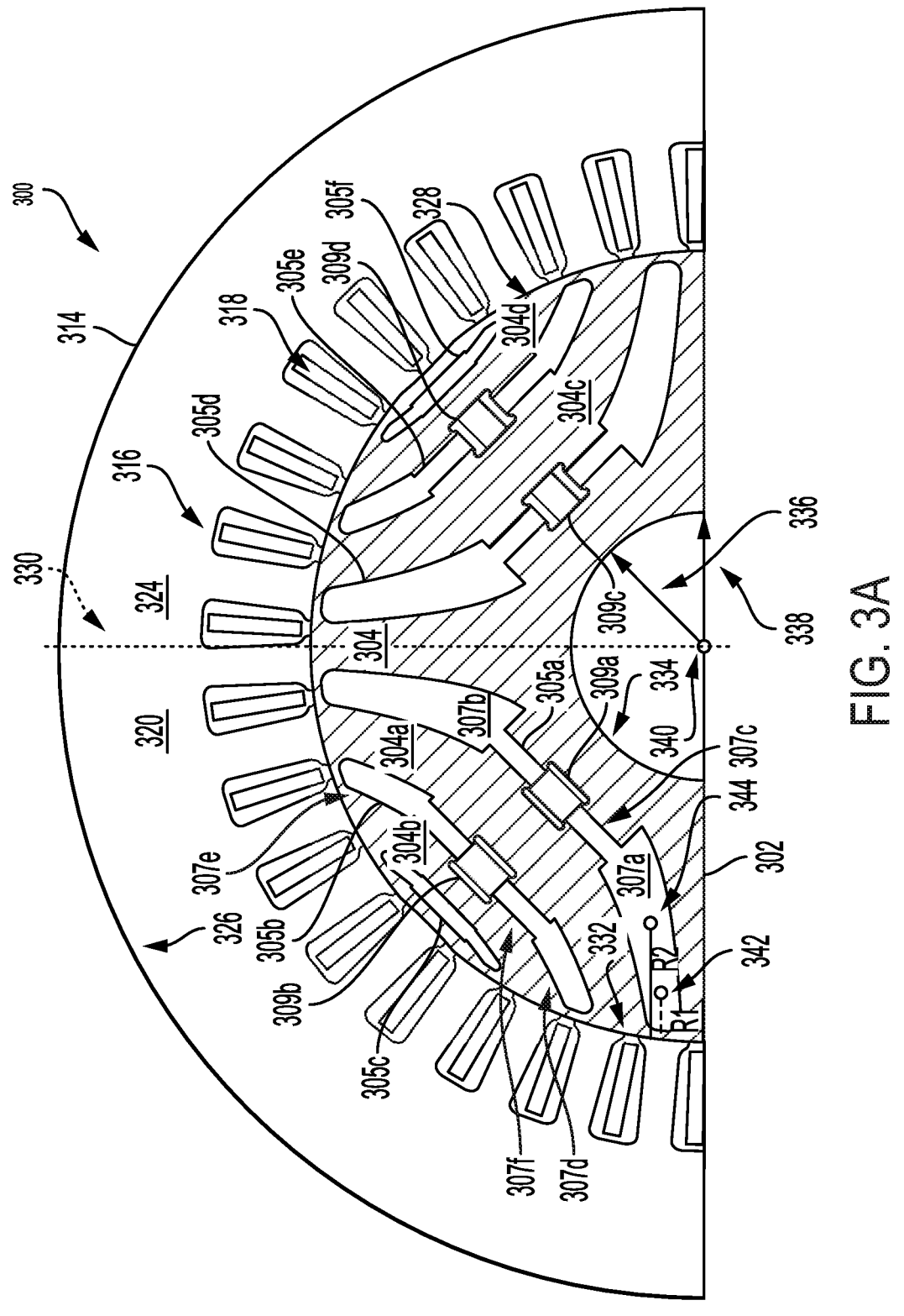
FIG. 3A, FIG. 3B, and FIG. 3C are schematic representations of a rotor lamination stack of an electric motor with interlocking elements.
Figure 3B:
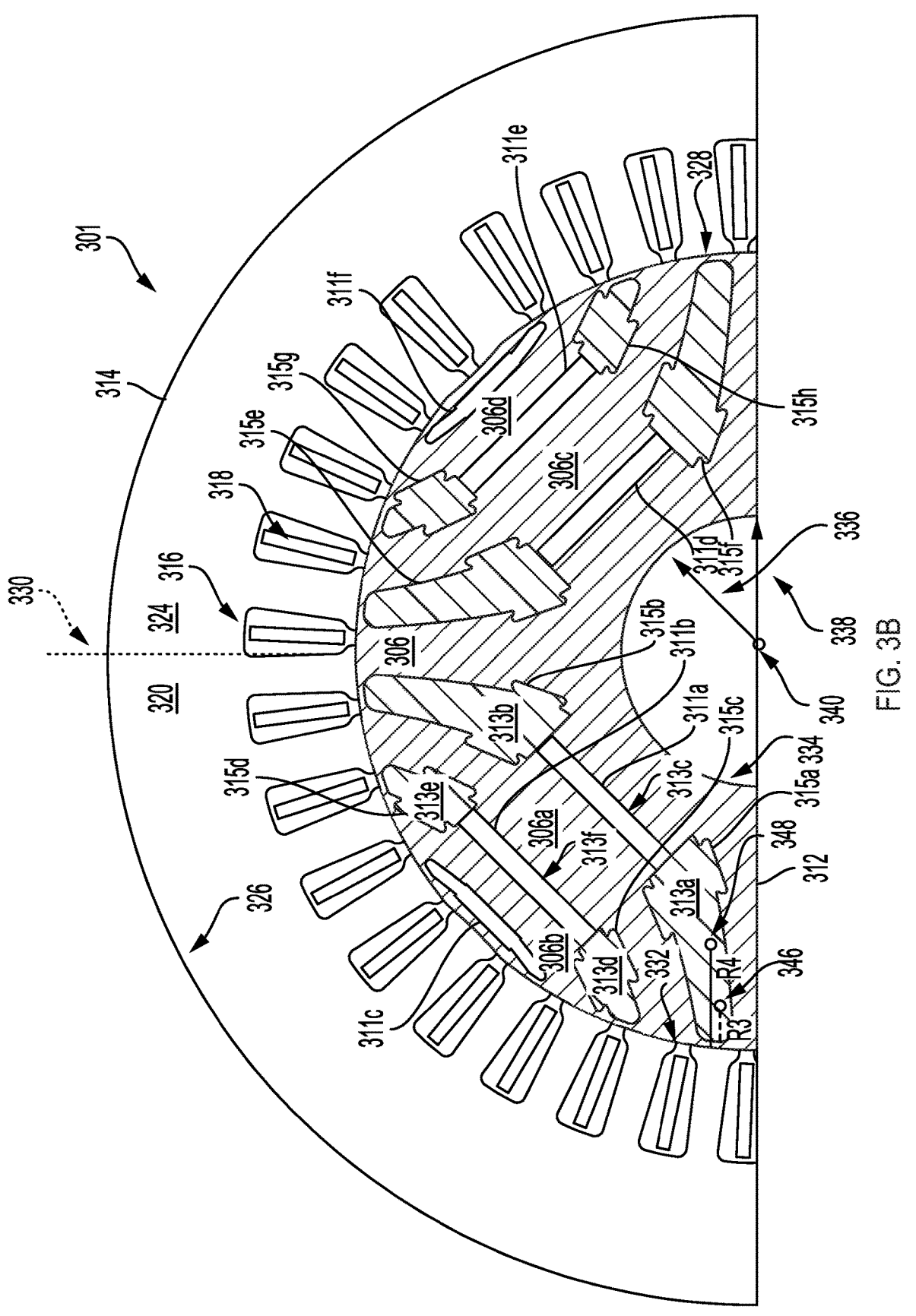
Figure 3C:
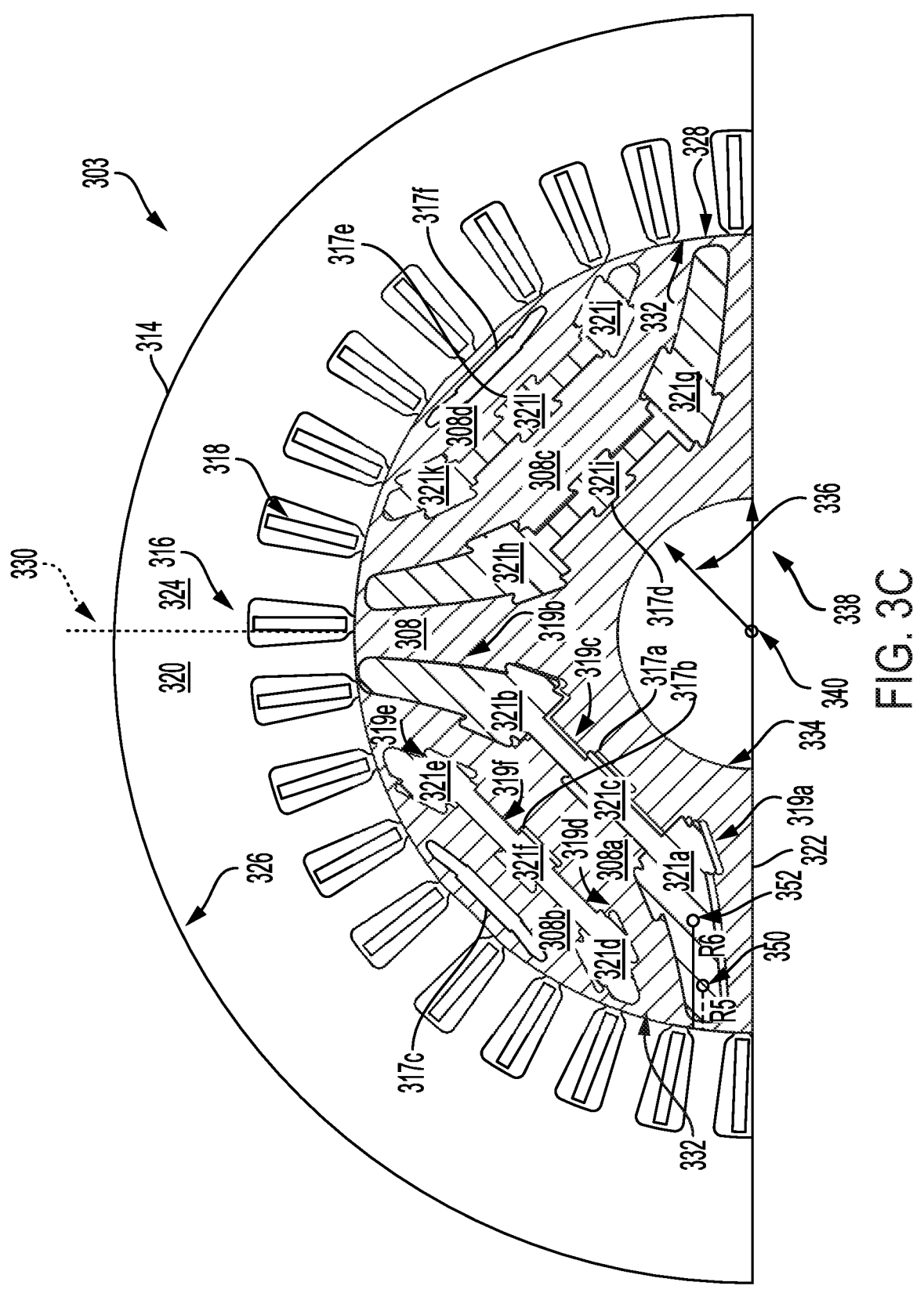
Figure 5:
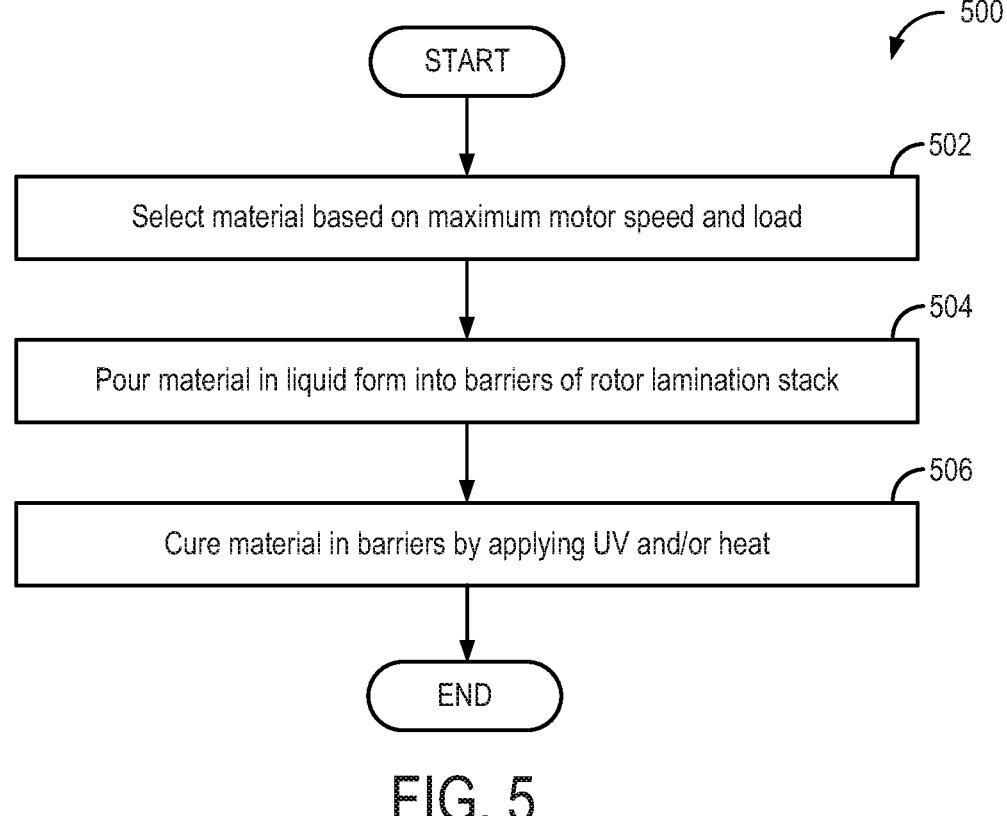
FIG. 5 is a flow diagram representation of a second method for manufacturing interlocking elements that depends on a rotor lamination stack.
Figure 6:
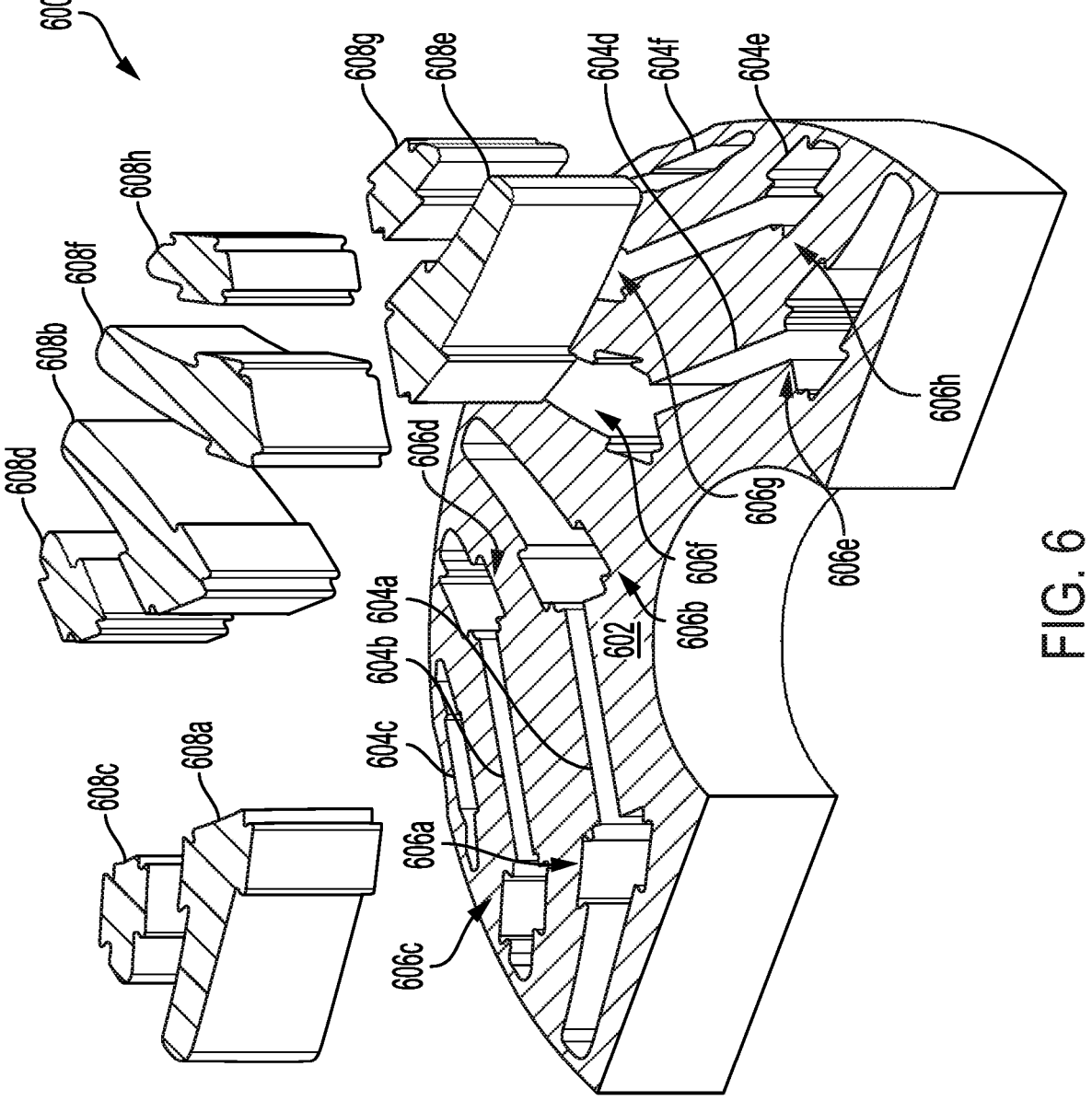
FIG. 6 illustrates a schematic of a rotor lamination stack with an exploded view of interlocking elements manufactured according to a first method.
Figure 7:
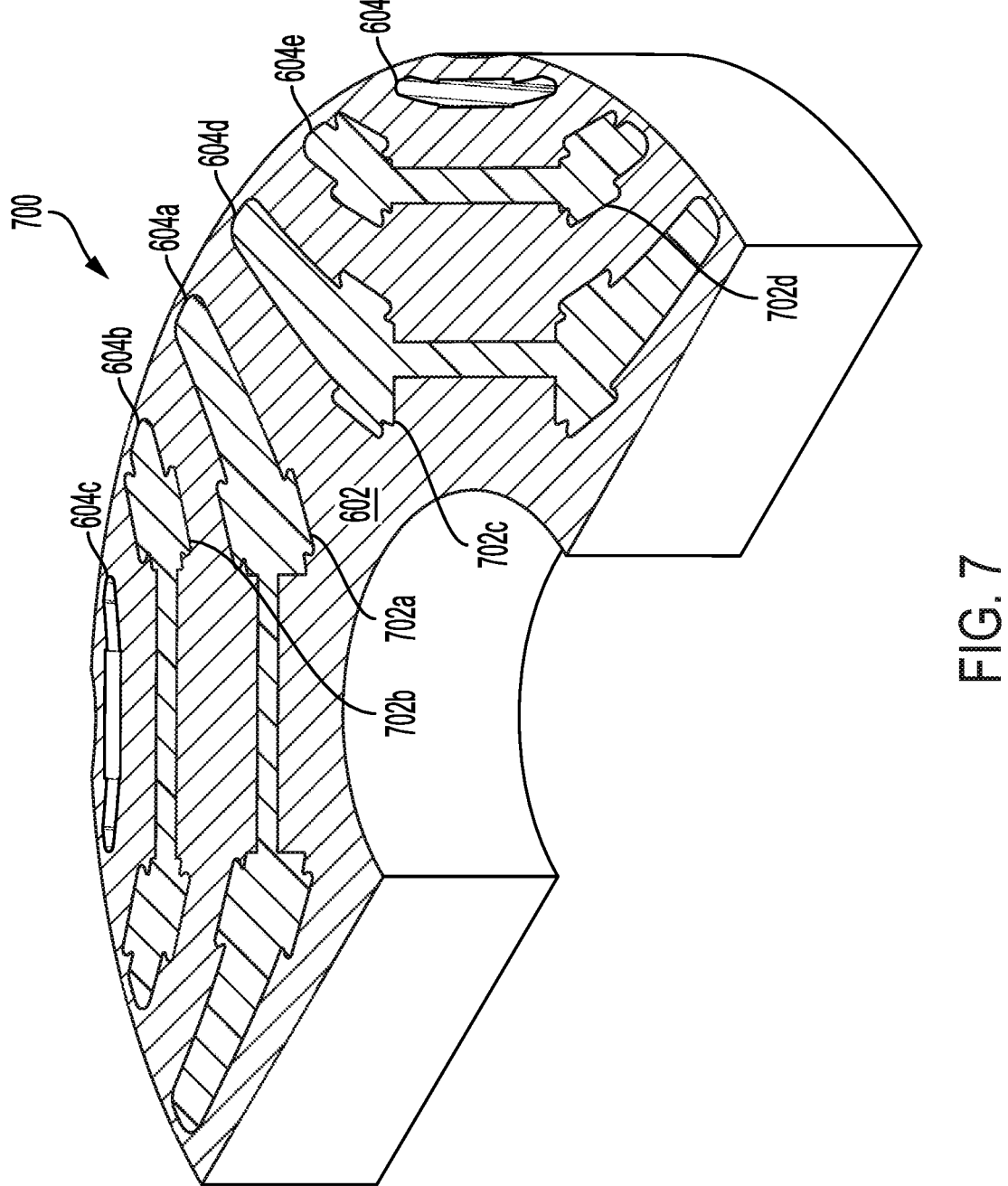
FIG. 7 illustrates a schematic of a rotor lamination stack with an exploded view of interlocking elements manufactured according to a second method.

A vehicle system, including an electric motor, that communicatively couples various components of the vehicle system is shown in FIG. 1. FIG. 2 illustrates a rotor lamination stack configured with a plurality of bridges. FIG. 3A-FIG. 3C illustrate various embodiments of a rotor lamination stack configured with a plurality of interlocking elements. A first method for manufacturing individual interlocking elements independent of a rotor lamination stack is described in FIG. 4. FIG. 5 describes a second method for manufacturing interlocking elements based on a structure of a rotor lamination stack. An example of a rotor lamination stack configured with interlocking elements fabricated according to a first method is shown in FIG. 6. An example of a rotor lamination stack configured with interlocking elements fabricated according to a second method is shown in FIG. 7. FIGS. 2, 3A, 3B, 3C, 6, and 7 are drawn to scale, although other relative dimensions may be used.

FIG. 1 shows a schematic depiction of a vehicle system 100. The vehicle system 100 may include rear vehicle wheels 104, front vehicle wheels 106, a traction battery 108, and an electric drive system 120. The electric drive system 120 may include an electric motor 102 and an electric drive 118 electrically coupled to the electric motor 102. The electric drive 118 may include an inverter communicatively coupled to a control system 110 to control speed and torque of the electric motor 102. The inverter may be electrically coupled to an electrical power source wherein executable instructions are configured, stored, and executed in at least one memory by at least one processor of the inverter.

The control system 110 may include a controller 112 of a plurality of controllers that is communicatively coupled to a plurality of sensors 114 and a plurality of actuators 116. The control system 110 may receive information, for example via controller 112, from a plurality of sensors 114 and send control signals to a plurality of actuators 116 based on the information received. The plurality of sensors 114 may include a plurality of position sensors, a plurality of a motor phase current sensors, and the like, as one example. As another example, the plurality of actuators 116 may include an electrical actuator to adjust speed and torque of the electric motor 102. The controller 112 may receive input data from the various sensors, process the input data, and control the actuators in response to the processed input data based on executable instruction or code programmed therein corresponding to one or more routines.

The vehicle system 100 may derive propulsion power from the electric motor 102. The electric motor 102 may be a synchronous reluctance motor (SynRM), a permanent magnet assisted synchronous reluctance motor (PMASynRM) and the like, as some examples. In some embodiments, a lamination of a rotor of the electric motor 102 may not be configured with internal bridges that reduce mechanical stress associated with barriers. Instead, the lamination may be configured with interlocking elements that reduce mechanical stress associated with barriers. In the present disclosure, the electric motor 102 is mounted in a rear wheel drive configuration. Other embodiments of the present disclosure may utilize alternative configurations, such as employing electric motor 102 in a front wheel configuration or employing a configuration wherein the electric motor 102 is mounted to both the rear vehicle wheels 104 and the front vehicle wheels 106. The electric motor 102 may receive electrical power from a traction battery 108 to provide torque to rear vehicle wheels 104. In some embodiments, the electric motor 102 may be operated as a generator to provide electrical power to charge traction battery 108, for example, during a braking operation.

The electric motor 102 may include a gearbox integrated therein. Additionally or alternatively, the electric motor 102 may be coupled to an outside of a transmission/gearbox housing. The integrated gearbox may include a differential gear set and a planetary gear set for transmitting power from the electric motor 102 to the rear vehicle wheels 104. The electric motor 102 may also include at least one clutch. A controller in a designated control system (e.g., not including the control system 110) of the vehicle system 100 may send a signal to an actuator of the clutch to engage or disengage the clutch, so as to couple or decouple power transmission from the electric motor 102 to the rear vehicle wheels 104 or from the electric motor 102 to the front vehicle wheels 106. Additionally or alternatively, there may be multiple traction batteries configured to provide power to different driven wheels, wherein power to the wheels may be predicated based on traction at the wheels, driver demand, and other conditions. In one example, the vehicle system 100 includes an all-wheel drive vehicle system.

Similar to the control system 110, the designated control system described above may receive information from a plurality of sensors and send control signals to a plurality of actuators based on the information received. The plurality of sensors may include a battery level sensor, a clutch activation sensor, and the like, as one example. As another example, the plurality of actuators may include a clutch. The controller in the designated control system may receive input data from the various sensors, process the input data, and control the actuators in response to the processed input data based on executable instruction or code programmed therein corresponding to one or more routines.

An axis system 122 is provided in FIG. 1 for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Turning now to FIG. 2, it shows a rotor 200, which may be integrated in an existing electric motor, such as electric motor 102 of FIG. 1. The electric motor may include a rotor 200, which may be currently implemented in existing electric motor systems, and a stator (not shown). The rotor 200 may comprise a magnetic portion 212 including a plurality of internal bridges 208 and a plurality of segments 210 and a non-magnetic portion comprising a plurality of barriers 206. The plurality of internal bridges 208 may include a first internal bridge 208a, a second internal bridge 208b, and a third internal bridge 208c and the plurality of segments 210 may include a first segment 210a, a second segment 210b, and a third segment 210c. The plurality of barriers 206 may include a first barrier 206a, a second barrier 206b, a third barrier 206c, and a fourth barrier 206d. Each barrier may be generally arc-shaped and spaced apart from each other by one segment. Further, one or more internal bridges may extend through each barrier. The internal bridges are manufactured in the rotor lamination and stamped with the rotor lamination itself, introducing a design constraint wherein a thickness of the internal bridges and a thickness of the rotor lamination is strategically selected.

For example, the first barrier 206a may be spaced apart from the second barrier 206b by the first segment 210a, the first internal bridge 208a extending through the first barrier 206a, and vice versa. The second barrier 206b may be spaced apart from the third barrier 206c by the second segment 210b, the second internal bridge 208b extending from the first segment 210a through the second barrier 206b to the second segment 210b, and vice versa. The third barrier 206c may be spaced apart from the fourth barrier 206d by the third segment 210c, the third internal bridge 208c extending from the second segment 210b through the third barrier 206c to the third segment 210c. The rotor 200 may be configured with the plurality of internal bridges, including the first internal bridge 208a, the second internal bridge 208b, and the third internal bridge 208c, to reduce mechanical stress associated with the presence of the plurality of barriers.

A rotor configured with the configuration described above includes regions of high reluctance and regions of low reluctance. An arrow 202 illustrates a region of high reluctance whereas an arrow 204 illustrates a region of low reluctance. The regions of high reluctance may include regions wherein magnetic flux encounters more resistance to flow and a magnitude of magnetic flux is reduced. The regions of low reluctance may include regions wherein magnetic flux encounters less resistance to flow and the magnitude of magnetic flux is greater.

A set of reference axes may include a d-axis 214 and a q-axis 216. When referencing direction, positive may refer to in the direction of the arrow of the d-axis 214 and q-axis 216 and negative may refer to in the opposite direction of the arrow of the d-axis 214 and q-axis 216. During operation of the electric motor 102, a direct current may be negative along the d-axis 214 and a quadrature current may be positive along the q-axis 216.

A current control scheme may be applied to the electric motor 102 according to at least one of a maximum torque per amp (MTPA), flux weakening, and maximum torque per volt (MTPV). The d-axis current may be negative to oppose and reduce rotor magnetic flux of rotor 200 in current control schemes that utilize flux weakening and MTPV. Due to the plurality of internal bridges being fabricated with electrical steel with a high permeability, the one or more internal bridges create a narrow path in the middle of the barriers that generate high leakage magnetic flux through the internal bridges. Consequently, radial forces are generated by an interaction between the high leakage magnetic flux and a stator rotating field. As such, a high ripple torque is experienced when operating the electric motor at high speeds and low speeds, reducing the performance of the electric motor and reducing a quality of driving experienced by a vehicle operator.

For example, in an embodiment wherein the motor is a traction motor, high ripple torque at low-speed and high-load may result in noticeable oscillations of the wheels that affect the driving experience of the vehicle operator and/or passengers. Ripple torque may be reduced by removing the plurality of internal bridges and increasing a thickness of external bridges or the crown around the rotor barrier. However, removal of the plurality of internal bridges reduces the mechanical strength of the rotor lamination stack which may not enable the electric motor to operate at high torque and/or speed. To achieve comparable mechanical strength of the rotor lamination stack, a plurality of interlocking elements may be positioned within one or more barriers of the plurality of barriers. Various embodiments of a rotor lamination stacks that integrate interlocking elements are shown in FIGS. 3A-3C below.

FIGS. 3A-3C illustrate various embodiments of an electric motor without a plurality of internal bridges, which may be an embodiment of the electric motor 102. The electric motor may include a rotor and a stator 314. The rotor may comprise a generally cylindrical rotor body including an outer surface 332 and an inner surface 334. The stator 314 may comprise a hollow, cylindrical shape that surrounds an outer surface 332 of the rotor coupled to a rotor shaft and a plurality of stator windings 318 electrically coupled to a control circuit of a plurality of circuits including at least one transistor. In some embodiments, a gap may be arranged between the stator 314 and the rotor.

A set of reference axes may include a d-axis 336 and a q-axis 338. When referencing direction, positive may refer to in the direction of the arrow of the d-axis 336 and q-axis 338 and negative may refer to in the opposite direction of the arrow of the d-axis 336 and q-axis 338. During operation of the electric motor 102, a direct current may be negative along the d-axis 336 and a quadrature current may be positive along the q-axis 338.

A current control scheme may be applied to the electric motor 102 according to at least one of a maximum torque per amp (MTPA), flux weakening, and maximum torque per volt (MTPV). The d-axis current may be negative to oppose and reduce rotor magnetic flux of rotor in current control schemes that utilize flux weakening and MTPV.

The rotor and the stator 314 may be concentric about a central axis 340. The rotor shaft may extend in a direction parallel to the central axis 340. The rotor may rotate about the central axis 340 as the stator 314 remains stationary. The rotor may be a rotor lamination stack comprising a magnetic portion 304 including a plurality of segments and a non-magnetic portion comprising a plurality of barriers and a plurality of interlocking elements. When compared to the rotor of FIG. 2, a thickness of an external barrier or crown of the barriers may be increased to compensate for a loss in mechanical strength associated with the internal bridges. The stator 314 may include stator windings 318 extending from a body therefrom. The stator 314 may include a plurality of slots 316 extending through a stator core of the stator 314. The plurality of slots 316 may receive one or more wires of a plurality of stator windings 318. In some embodiments, the plurality of stator windings 318 may be an I shaped winding or a U-shaped winding. The plurality of stator windings 318 may be electrically coupled to a control circuit of a plurality of circuits. The control circuit may include at least one transistor to apply a current to the plurality of stator windings 318 to generate a magnetic field wherein the d-axis 336 of the rotor aligns with. The plurality of stator windings 318 may extend through the plurality of slots 316. In one example, the axial direction may be parallel to the central axis 340.

In one example, the stator 314 includes an inner surface 328 nearest to the rotor and an outer surface 326 distal to the rotor. The plurality of slots 316 may traverse between the inner surface 328 and outer surface 326 toward the end surfaces of the stator 314. The plurality of slots 316 may be arranged in the stator core via additive manufacturing, injection molding, or other manufacturing technique, such as stack of stamp or cut electrical steel sheets. The plurality of stator windings 318 may extend in a direction parallel to the slots, wherein winding ends may be connected to one another via welds or other connections. The plurality of slots 316 may include electric wires (e.g., windings) arranged therein.

Each of the plurality of slots 316 may include two or more unique sections, characterized by their different widths. The width may be measured in a direction normal to each of the axial and radial directions. The plurality of slots 316 may be arranged adjacent to the inner surface 328. The inner surface 328 may include a circular cross-section and may be concentric with the rotor about the central axis 340 of the rotor shaft. The inner surface 328 may be sealed except for a plurality of openings arranged therein corresponding to slot openings of the plurality of slots 316.

Similar to the rotor 200 of FIG. 2, the rotor may be configured with regions of high reluctance and regions of low reluctance due to the presence of the plurality of barriers. The regions of high reluctance may include regions wherein magnetic flux encounters more resistance to flow and a magnitude of magnetic flux is reduced. The regions of low reluctance may include regions wherein magnetic flux encounters less resistance to flow and the magnitude of magnetic flux is greater.

A first embodiment of an electric motor 300 with interlocking element is shown in FIG. 3A. The rotor may be a rotor lamination stack 302 comprising a magnetic portion 304 including a plurality of segments and a non-magnetic portion comprising a plurality of barriers and a plurality of interlocking elements. The plurality of segments may include a first segment 304a and a second segment 304b in a first quadrant 320 of the rotor lamination stack 302 and a third segment 304c and a fourth segment 304d in a second quadrant 324 of the rotor. The first quadrant 320 and the second quadrant 324 may be demarcated by the dotted line 330. The plurality of barriers may include a first barrier 305a, a second barrier 305b, and a third barrier 305c in the first quadrant 320 of the rotor lamination stack 302 and a fourth barrier 305d, a fifth barrier 305e, and a sixth barrier 305f in the second quadrant 324 of the rotor.

At least one interlocking element may be arranged in one or more barriers wherein a shape of the at least one interlocking element matches curves and edges of the barrier, enabling the at least one interlocking element to be positioned within the barrier. Each barrier may be generally arc-shaped and spaced apart from each other by one segment. As one example, with respect to the first quadrant 320, the first barrier 305a may be spaced apart from the second barrier 305b by the first segment 304a and the second barrier 305b may be spaced apart from the third barrier 305c by the second segment 304b. With regard to the second quadrant 324, the fourth barrier 305d may be spaced apart from the fifth barrier 305e by the third segment 304c and the fifth barrier 305e may be spaced apart from the sixth barrier 305f by the fourth segment 304d.

Additionally, each barrier may comprise two peripheral ends that extend toward an outer surface 332 of the rotor lamination stack 302 and a middle portion spaced between two peripheral ends. The middle portion may enclose a permanent magnet of a plurality of permanent magnets of the rotor lamination stack 302. For example, the first barrier 305a may include a first peripheral end 307a, a second peripheral end 307b, and a first middle portion 307c whereas the second barrier 305b may include a third peripheral end 307d, a fourth peripheral end 307e, and a second middle portion 307f. The first peripheral end 307a and the second peripheral end 307b extend toward the outer surface 332 of the rotor lamination stack 302 and the third peripheral end 307d and the fourth peripheral end 307e may extend toward the outer surface 332.

The first middle portion 307c is spaced between the first peripheral end 307a and the second peripheral end 307b and the second middle portion 307f is spaced between the third peripheral end 307d and the fourth peripheral end 307e.

Both of the first middle portion 307c and the second middle portion 307f may enclose a permanent magnet of a plurality of magnets.

In one embodiment, a curvature and the width of a barrier may vary based on a radial distance between the barrier and the outer surface of the rotor lamination stack 302. More specifically, the curvature and width of the barrier decrease as the radial distance of the barrier from the outer surface 332 decreases. In other words, the curvature and width of the barrier increase as the radial distance of the barrier from the inner surface 334 decreases. As one example, when comparing the first barrier 305a and the second barrier 305b, the first barrier 305a is positioned closer to the inner surface 334 of the rotor lamination stack 302 than the second barrier 305b. Therefore, the radial distance of the second barrier 305b from the outer surface 332 is less than the radial distance of the first barrier 305a from the outer surface 332. Accordingly, a curvature and width of the first barrier 305a is greater than that of the second barrier 305b.

In another embodiment, a curvature and width of a peripheral end of the barrier may vary based on a radial distance between a point on the peripheral end and the outer surface 332 of the rotor lamination stack. As such, the curvature of the peripheral end may increase and the width of the peripheral end may decrease as the radial distance between the point on the peripheral end and the outer surface 332 decreases. As one example, a first point 342 on the first peripheral end 307a is closer to the outer surface 332 than the second point 344 on the first peripheral end 307a. Therefore, the radial distance R1 of the first point 342 is less than the radial distance R2 of the second point 344 from the outer surface 332. Due to the radial distance R1 of the first point 342 being smaller, the curvature of the first peripheral end 307a at the first point 342 is greater than the curvature at the second point 344. Additionally, the width of the first peripheral end 307a at the first point 342 is less than the width at the second point 344.

As shown in FIG. 3A, a cross section of the middle portions of the barriers may include two protruding rounded rectangular-shaped edges disposed at the center of the middle portions. In one example, the cross section of the first middle portion 307c of the first barrier 305a and cross section of the second middle portion 307f of the second barrier 305b includes two protruding rounded rectangular-shaped edges disposed at a center of the first middle portion 307c and the second middle portion 307f, respectively. Similarly, the cross sections of the fourth barrier 305d and the fifth barrier 305e include the two protruding rounded rectangular-shaped edges disposed at the center of the middle portions. Since the shape of interlocking elements match the curves and edges of the barrier wherein the interlocking elements are positioned in, the shape of a first interlocking element 309a, a second interlocking element 309b, a third interlocking element 309c, and a fourth interlocking element 309d are configured to enable the plurality of interlocking element to be inserted within their respective barriers.

The at least one interlocking element arranged in the one or more barriers of the rotor lamination stack 302 may include one centered interlocking element. The one centered interlocking element may comprise a first interlocking member with a rectangular-shaped cross section with two parallel, convex sides. The first interlocking element 309a, the second interlocking element 309b, the third interlocking element 309c, a fourth interlocking element 309d may be centered interlocking elements that may be positioned within the middle portions of the first barrier 305a, the second barrier 305b, the fourth barrier 305d, and the fifth barrier 305c, respectively.

A second embodiment of an electric motor 301 is shown in FIG. 3B. The rotor may be a rotor lamination stack 312 comprising a magnetic portion 306 including a plurality of segments and a non-magnetic portion comprising a plurality of barriers and a plurality of interlocking elements. The plurality of segments may include a first segment 306a and a second segment 306b in a first quadrant 320 of the rotor lamination stack 312 and a third segment 306c and a fourth segment 306d in a second quadrant 324 of the rotor. The first quadrant 320 and the second quadrant 324 may be demarcated by the dotted line 330. The plurality of barriers may include a first barrier 311a, a second barrier 311b, and a third barrier 311c in the first quadrant 320 of the rotor lamination stack 312 and a fourth barrier 311d, a fifth barrier 311e, and a sixth barrier 311f in the second quadrant 324 of the rotor lamination stack.

At least one interlocking element may be arranged in one or more barriers wherein the shape of the at least one interlocking element matches curves and edges of the barrier which enables the at least one interlocking element to be positioned within a barrier. Each barrier may be generally arc-shaped and spaced apart from each other by one segment. As one example, with respect to the first quadrant 320, the first barrier 311a may be spaced apart from the second barrier 311b by the first segment 306a and the second barrier 311b may be spaced apart from the third barrier 311c by the second segment 306b. With regard to the second quadrant 324, the fourth barrier 311d may be spaced apart from the fifth barrier 311e by the third segment 306c and the fifth barrier 311e may be spaced apart from the sixth barrier 311f by the fourth segment 306d.

Additionally, each barrier may comprise two peripheral ends that extend toward an outer surface 332 of the rotor lamination stack 312 and a middle portion spaced between two peripheral ends. The middle portion may enclose a permanent magnet of a plurality of permanent magnets of the rotor lamination stack 312. For example, the first barrier 311a may include a first peripheral end 313a, a second peripheral end 313b, and a first middle portion 313c whereas the second barrier 311b may include a third peripheral end 313d, a fourth peripheral end 313e, and a second middle portion 313f. The first peripheral end 313a and the second peripheral end 313b extend toward the outer surface 332 of the rotor lamination stack 312 and the third peripheral end 313d and the fourth peripheral end 313e may extend toward the outer surface 332.

The first middle portion 313c is spaced between the first peripheral end 313a and the second peripheral end 313b and the second middle portion 313f is spaced between the third peripheral end 313d and the fourth peripheral end 313c. Both of the first middle portion 313c and the second middle portion 313f may enclose a permanent magnet of a plurality of magnets.

In one embodiment, a curvature and the width of a barrier may vary based on a radial distance between the barrier and the outer surface of the rotor lamination stack 312. More specifically, the curvature and width of the barrier decrease as the radial distance of the barrier from the outer surface 332 decreases. In other words, the curvature and width of the barrier increase as the radial distance of the barrier from the inner surface 334 decreases. As one example, when comparing the first barrier 311a and the second barrier 311b, the first barrier 311a is positioned closer to the inner surface 334 of the rotor lamination stack 312 than the second barrier 311b. Therefore, the radial distance of the second barrier 311b from the outer surface 332 is less than the radial distance of the first barrier 311a from the outer surface 332. Accordingly, a curvature and width of the first barrier 311a is greater than that of the second barrier 311b.

In another embodiment, a curvature and width of a peripheral end of the barrier may vary based on a radial distance between a point on the peripheral end and the outer surface 332 of the rotor lamination stack. As such, the curvature of the peripheral end may increase and the width of the peripheral end may decrease as the radial distance between the point on the peripheral end and the outer surface 332 decreases. As one example, a third point 346 on the first peripheral end 313a is closer to the outer surface 332 than the fourth point 348 on the first peripheral end 313a. Therefore, the radial distance R3 of the third point 346 is less than the radial distance R4 of the fourth point 348 from the outer surface 332. Due to the radial distance R3 of the third point 346 being smaller, the curvature of the first peripheral end 313a at the third point 346 is greater than the curvature at the fourth point 348. Additionally, the width of the first peripheral end 313a at the third point 346 is less than the width at the fourth point 348.

As shown in FIG. 3B, a cross section of the two peripheral ends of the barriers may be generally rounded swept wing-shaped with two protruding rounded rectangular shaped edges disposed toward one end relative to the other end of each peripheral end and a cross section of the middle portions of the barriers may be rectangular-shaped. As one example, the cross section of the two peripheral ends of the first barrier 311a, the second barrier 311b, the fourth barrier 311d and the fifth barrier 311e may be generally rounded swept wing-shaped cross section with two protruding rounded rectangular shaped edges disposed toward one end relative to the other end of each peripheral end. The cross section of the middle portion of the first barrier 311a, the second barrier 311b, the fourth barrier 311d, and the fifth barrier 311e may be rectangular shaped.

Since the shape of interlocking elements match the curves and edges of the barrier wherein the interlocking elements are positioned in, a shape of a first interlocking element 315a and a second interlocking element 315b of the first barrier 311a, a shape of a third interlocking element 315c and a fourth interlocking element 315d of the second barrier 311b, a shape of a fifth interlocking element 315e and a sixth interlocking element 315f of the fourth barrier 311d, and a shape of a seventh interlocking element 315g and an eighth interlocking element 315h of the fifth barrier 311e are configured to enable the plurality of interlocking elements to be inserted within their respective barriers.

The peripheral interlocking elements arranged in the one or more barriers of the rotor lamination stack 312 may include two lateral interlocking elements. The two lateral interlocking element may comprise a first lateral interlocking element being positioned at a first peripheral end of the barrier and a second lateral interlocking element being positioned at a second peripheral end of the barrier. A lateral interlocking element may comprise a second interlocking member with a generally rounded swept wing-shaped cross section with two protruding rounded rectangular-shaped edge disposed toward one end relative to the other end of the second interlocking member. The two protruding rounded rectangular shaped edges may be disposed on different sides of the cross section.

The first interlocking element 315a and the second interlocking element 315b of the first barrier 311a, the third interlocking element 315c and the fourth interlocking element 315d of the second barrier 311b, the fifth interlocking element 315e and the sixth interlocking element 315f of the fourth barrier 311d, and the seventh interlocking element 315g and the eighth interlocking element 315h of the fifth barrier 311e may be lateral interlocking elements. In an example, the first interlocking element 315a may be positioned at a first peripheral end 313a and the second interlocking element 315b may be positioned at a second peripheral end 313b of the first barrier 311a. Similarly, the third interlocking element 315c may be positioned at the third peripheral end 313d and the fourth interlocking element 315d may be positioned at the fourth peripheral end 313e of the second barrier 311b. The first interlocking element 315a, the second interlocking element 315b, the third interlocking element 315c, the fourth interlocking element 315d, the fifth interlocking element 315c, the sixth interlocking element 315f, the seventh interlocking element 315g, and the eighth interlocking element 315h may have a cross section that is a generally rounded swept wing-shaped with two protruding rounded rectangular-shaped edges disposed toward one end relative to the other end of the respective interlocking element. In this way, the first interlocking element 315a and the second interlocking element 315b may be inserted into the first barrier 311a, the third interlocking element 315c and the fourth interlocking element 315d may be inserted in the second barrier 311b, the fifth interlocking element 315e and the sixth interlocking element 315f may be inserted into the fourth barrier 311d, and the seventh interlocking element 315g and the eighth interlocking element 315h may be inserted into the fifth barrier 311c.

A third embodiment of an electric motor 303 is shown in FIG. 3C. The rotor may be a rotor lamination stack 322 comprising a magnetic portion 308 including a plurality of segments and a non-magnetic portion comprising a plurality of barriers and a plurality of interlocking elements. The plurality of segments may include a first segment 308a and a second segment 308b in a first quadrant 320 of the rotor lamination stack 322 and a third segment 308c and a fourth segment 308d in a second quadrant 324 of the rotor. The first quadrant 320 and the second quadrant 324 may be demarcated by the dotted line 330. The plurality of barriers may include a first barrier 317a, a second barrier 317b, and a third barrier 317c in the first quadrant 320 of the rotor lamination stack 322 and a fourth barrier 317d, a fifth barrier 317e, and a sixth barrier 317f in the second quadrant 324 of the rotor lamination stack.

At least one interlocking element may be arranged in one or more barriers wherein the shape of the at least one interlocking element matches the curves and edges of the barrier, which enables the at least one interlocking element to be positioned within a barrier. Each barrier may be generally arc-shaped and spaced apart from each other by one segment. As one example, with respect to the first quadrant 320, the first barrier 317a may be spaced apart from the second barrier 317b by the first segment 308a and the second barrier 317b may be spaced apart from the third barrier 317c by the second segment 308b. With regard to the second quadrant 324, the fourth barrier 317d may be spaced apart from the fifth barrier 317e by the third segment 308c and the fifth barrier 317e may be spaced apart from the sixth barrier 317f by the fourth segment 308d.

Additionally, each barrier may comprise two peripheral ends that extend toward an outer surface 332 of the rotor lamination stack 322 and a middle portion spaced between two peripheral ends. The middle portion may enclose a permanent magnet of a plurality of permanent magnets of the rotor lamination stack 322. For example, the first barrier 317a may include a first peripheral end 319a, a second peripheral end 319b, and a first middle portion 319c whereas the second barrier 317b may include a third peripheral end 319d, a fourth peripheral end 319e, and a second middle portion 319f. The first peripheral end 319a and the second peripheral end 319b extend toward the outer surface 332 of the rotor lamination stack 322 and the third peripheral end 319d and the fourth peripheral end 319e may extend toward the outer surface 332.

The first middle portion 319c is spaced between the first peripheral end 319a and the second peripheral end 319b and the second middle portion 319f is spaced between the third peripheral end 319d and the fourth peripheral end 319e. Both the first middle portion 319c and the second middle portion 319f may enclose a permanent magnet of a plurality of magnets.

In one embodiment, a curvature and the width of a barrier may vary based on a radial distance between the barrier and the outer surface of the rotor lamination stack 322. More specifically, the curvature and width of the barrier decrease as the radial distance of the barrier from the outer surface 332 decreases. In other words, the curvature and width of the barrier increase as the radial distance of the barrier from the inner surface 334 decreases. As one example, when comparing the first barrier 317a and the second barrier 317b, the first barrier 317a is positioned closer to the inner surface 334 of the rotor lamination stack 322 than the second barrier 317b. Therefore, the radial distance of the second barrier 317b from the outer surface 332 is less than the radial distance of the first barrier 317a from the outer surface 332. Accordingly, a curvature and width of the first barrier 317a is greater than that of the second barrier 317b.

In another embodiment, a curvature and width of a peripheral end of the barrier may vary based on a radial distance between a point on the peripheral end and the outer surface 332 of the rotor lamination stack. As such, the curvature of the peripheral end may increase and the width of the peripheral end may decrease as the radial distance between the point on the peripheral end and the outer surface 332 decreases. As one example, a fifth point 350 on the first peripheral end 319a is closer to the outer surface 332 than the sixth point 352 on the first peripheral end 319a. Therefore, the radial distance R5 of the fifth point 350 is less than the radial distance R6 of the sixth point 352 from the outer surface 332. Due to the radial distance R5 of the fifth point 350 being smaller, the curvature of the first peripheral end 319a at the fifth point 350 is greater than the curvature at the sixth point 352. Additionally, the width of the first peripheral end 319a at the fifth point 350 is less than the width at the sixth point 352.

As shown in FIG. 3C, a cross section of the two peripheral ends of the barriers may be generally rounded swept wing-shaped with two protruding rounded rectangular shaped edges disposed toward one end of each peripheral end relative to another end of each peripheral end and the middle portions of the barriers may have rectangular-shaped cross sections with two protruding rounded rectangular-shaped edges disposed at a center of the middle portion. The two protruding rounded rectangular-shaped edges disposed toward one end of each peripheral end relative to the other end of each peripheral end may be disposed on different sides of the cross-section. As one example, the two peripheral ends of the first barrier 317a, the second barrier 317b, the fourth barrier 317d and the fifth barrier 317e may be generally rounded swept wing-shaped cross section with two protruding rounded rectangular shaped edges disposed toward one end of each peripheral end relative to the other end of each peripheral end. The middle portions of the first barrier 317a, the second barrier 317b, the fourth barrier 317d, and the fifth barrier 317e may be rectangular shaped with two protruding rounded rectangular-shaped edges disposed at a center of the middle portion.

Since the shape of interlocking match the curves and edges of the barrier, wherein the interlocking elements are positioned in, a shape of a first interlocking element 321a, a second interlocking element 321b, and a third interlocking element 321c of the first barrier 317a, a shape of a fourth interlocking element 321d, a fifth interlocking element 321e, and a sixth interlocking element 321f of the second barrier 317b, a shape of a seventh interlocking element 321g, an eighth interlocking element 321h, and a ninth interlocking element 321i of the fourth barrier 317d, and a shape of a tenth interlocking element 321j, an eleventh interlocking element 321k, and a twelfth interlocking element 321l of the fifth barrier 317e are configured to enable the plurality of interlocking elements to be inserted within their respective barriers.

The peripheral interlocking elements arranged in the one or more barriers of the rotor lamination stack 322 may include three interlocking elements comprising two lateral interlocking elements, and a middle interlocking element comprising a third interlocking member with a rectangular-shaped cross section with two protruding rounded rectangular-shaped edges being disposed at a center of the third interlocking member The two protruding rounded rectangular shaped edges may be disposed on different sides of the cross section.

The first interlocking element 321a and the second interlocking element 321b of the first barrier 317a, the fourth interlocking element 321d and the fifth interlocking element 321e of the second barrier 317b, the seventh interlocking element 321g and the eighth interlocking element 321h of the fourth barrier 317d, the tenth interlocking element 321j and the eleventh interlocking element 321k of the fifth barrier 317e may be lateral interlocking elements. The third interlocking element 321c, the sixth interlocking element 321f, the ninth interlocking element 321i, and the twelfth interlocking element 321l may be middle interlocking elements.

In an example, the first interlocking element 321a may be positioned at a first peripheral end 319a and the second interlocking element 321b may be positioned at a second peripheral end 319b of the first barrier 317a. The third interlocking element 321c may be positioned in the first middle portion 319c. Similarly, the fourth interlocking element 321d may be positioned at the third peripheral end 319d and the fifth interlocking element 321e may be positioned at the fourth peripheral end 319e of the second barrier 317b.

The sixth interlocking element 321f may be positioned in the second middle portion 319f. The first interlocking element 321a, the second interlocking element 321b, the fourth interlocking element 321d, the fifth interlocking element 321e, the seventh interlocking element 321g, the eighth interlocking element 321h, the tenth interlocking element 321j, and the eleventh interlocking element 321k may have a cross section that is a generally rounded swept wing-shaped cross section with two protruding rounded rectangular-shaped edges disposed toward one end of the respective interlocking element relative to the other end. The third interlocking element 321c, the sixth interlocking element 321f, the ninth interlocking element 321i, and the twelfth interlocking element 321l may have a cross section that is generally rectangular-shaped with two protruding rounded rectangular-shaped edges disposed at the center of the respective interlocking element.

In this way, the first interlocking element 321a, the second interlocking element 321b, and the third interlocking element 321c may be inserted into the first barrier 317a, the fourth interlocking element 321d, the fifth interlocking element 321e, and the sixth interlocking element 321f may be inserted in the second barrier 317b, the seventh interlocking element 321g, the eight interlocking element 321h, and the ninth interlocking element 321i may be inserted into the fourth barrier 317d, and the tenth interlocking element 321j, the eleventh interlocking element 321k, and the twelfth interlocking element 321l may be inserted into the fifth barrier 317e.

It may be understood that the rotor lamination stacks discussed above with respect to FIGS. 3A-3B are exemplary and may deviate without departing from the scope of the present disclosure. As one example, other embodiments of the present disclosure may include additional or fewer barriers and different positioning of the barriers depending on design constraints, such as size, desired operating metrics, embeddings of permanent magnets for PMASynRM motors, and the like. As another example, other embodiments of the present disclosure may include additional or few interlocking elements and different positioning of the interlocking elements.

By including interlocking elements in the rotor lamination stacks of FIGS. 3A-3C, torque ripple, pulsing radial forces at a gap between the rotor and stator, jerky motion, and velocity ripple of electric motors at various operating speeds may be reduced without compromising mechanical strength of the rotor lamination stack. Further, a rotor lamination stack configuration with interlocking elements may reduce costs associated with fabricating the rotor lamination stack. In particular, since the rotor lamination stack configuration does not include internal bridges, the rotor lamination stack is not constructed with a specialized mold and lamination that incurs additional costs during manufacturing, the specialized mold and lamination being a more difficult shape to manufacture due to the presence of internal bridges.

Figure 4:
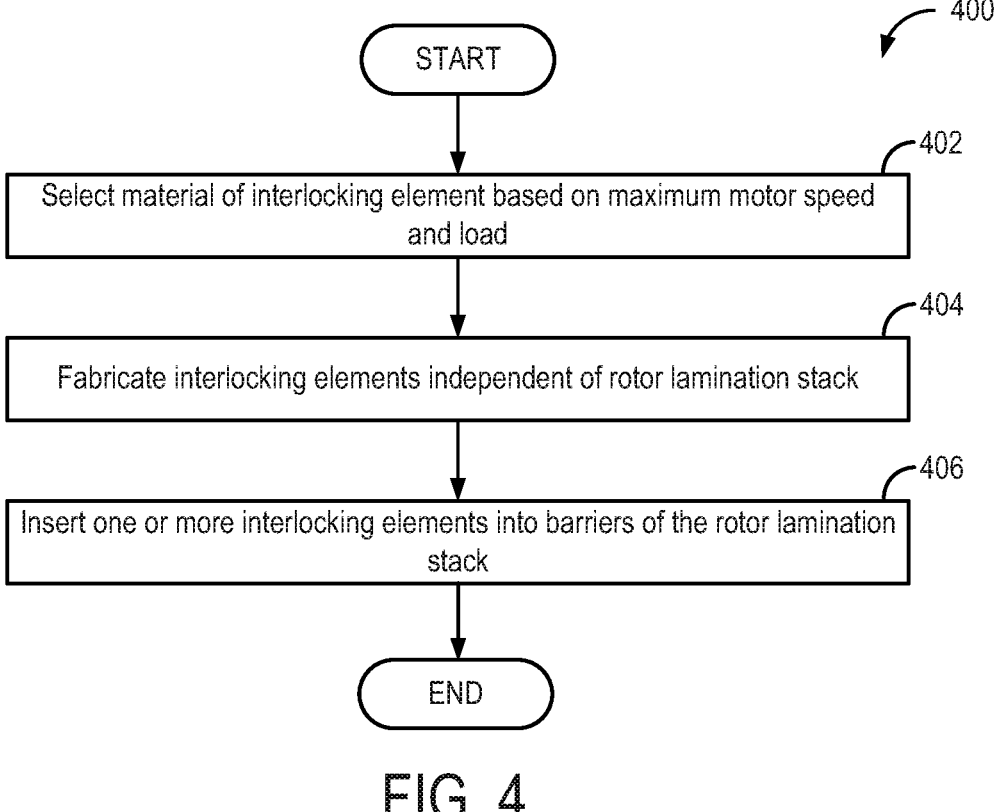
FIG. 4 is a flow diagram representation of a first method for manufacturing interlocking elements independent of a rotor lamination stack.

A method 400 for fabricating a plurality of interlocking elements is shown in FIG. 4. The plurality of interlocking elements may be interlocking elements included in the various embodiments of the rotor lamination stack illustrated in FIGS. 3A-3C or another suitable rotor lamination stack. The method 400 may be implemented by one or more machines such as machines configured for molding or three-dimensional (3D) printing, etc. The machines may include instructions stored in memory executable by a processor to implement the different steps. To elaborate, at least some of the method steps may be implemented as an automated machine process. However, in other examples, at least some of the steps may be implemented in response to user input or may be manually implemented via manufacturing personnel.

At 402, the method 400 includes selecting a material of an interlocking element based on maximum motor speed and load. The material of the interlocking element may be selected based on an ability of the material to support a motor operating at a pre-determined maximum motor speed and load. The rotor lamination stack relies on the plurality of interlocking elements instead of internal bridges to reduce mechanical stresses associated with a plurality of barriers. As such, the material is robust enough to reduce mechanical weakening due to the absence of the internal barriers and does not interfere with magnetic flux inside the rotor lamination stack. In particular, a material that is non-magnetic and non-metal with behavior similar to air may be a suitable candidate and high magnetic reluctance (e.g., low magnetic permeability). For example, the material may be rubber, plastic, carbon fiber, compound materials and the like.

At 404, the method 400 includes fabricating interlocking elements independent of a rotor lamination stack. In some embodiments, the interlocking elements may be constructed with three-dimensional (3D) printing or additive manufacturing. In particular, separate and individual models for the centered interlocking element, the lateral interlocking element (e.g., one for each peripheral end), and the middle interlocking element may be created. Accordingly, additive manufacturing technology may construct the centered interlocking element, the lateral interlocking element, and the middle interlocking element based on the models for each type of interlocking element.

In other embodiments, the interlocking elements may be fabricated with a mold separate from the rotor lamination stack. An automated system may cause machinery to pour a liquid form of the material into an interlocking element mold, which may include a mold for a centered interlocking element, a lateral interlocking element (e.g., one for each peripheral end), and a middle interlocking element, for example. The material may be cured to solidify the material and form solid, individual interlocking elements by exposing the material to ultraviolet (UV) rays and/or heating material to a pre-determined temperature while the material is in the mold. In this way, solid, individual interlocking elements in the shape of the first interlocking element, the lateral interlocking element, and the middle interlocking may be constructed.

At 406, the method 400 includes inserting one or more interlocking element into barriers of the rotor lamination stack. In some embodiments, machinery may assemble the rotor lamination stack and insert the one or more interlocking elements into one or more barriers of the rotor lamination stack. In other embodiments, inserting the interlocking elements into the rotor lamination stack may be performed manually by an assembly line worker. In this way, the lateral interlocking element may be inserted within a peripheral end of a barrier and the middle interlocking element or centered interlocking element may be inserted within a middle portion of a barrier. The method 400 then ends.

A method 500 for fabricating a plurality of interlocking elements is shown in FIG. 5. The plurality of interlocking elements may be interlocking elements included in the various embodiments of the rotor lamination stack illustrated in FIGS. 3A-3C or another suitable rotor lamination stack. The method 500 may be implemented by one or more machines such as machines configured for molding, three-dimensional (3D) printing or additive manufacturing, and assembly etc. The machines may include instructions stored in memory executable by a processor to implement the different steps. To elaborate, at least some of the method steps may be implemented as an automated machine process. However, in other examples, at least some of the steps may be implemented in response to user input or may be manually implemented via manufacturing personnel.

At 502, the method 500 includes selecting a material of an interlocking element based on maximum motor speed and load. The material of the interlocking element may be selected based on an ability of the material to support a motor operating at a pre-determined maximum motor speed and load, similar to the method described with respect to FIG. 4. As such, the material may be robust enough to reduce mechanical weakening due to the absence of the internal barriers and does not interfere with magnetic flux inside the rotor lamination stack. In particular, a compound material that is non-magnetic and non-metal with behavior similar to air may be a suitable candidate and high magnetic reluctance (e.g., low magnetic permeability). For example, the material compound may be a polycarbonate resin, epoxy resin, and the like.

At 504, the method 500 includes pouring material in liquid form into a barrier of a rotor lamination stack. The barriers of the rotor lamination stack may act as a mold for the interlocking elements. In some embodiments, the material may be poured into specific areas of the barrier, such as the peripheral ends or the middle portion. In other embodiments, the material may be poured into the entire barrier to form a single interlocking element that fills the entire barrier. More specifically, an automated system may cause machinery to pour a liquid form of the material into barriers of the rotor lamination stack, each barrier may be filled individually by the machinery enabling either the entire barrier or specific areas of the barrier to be filled with the liquid material.

At 506, the method 500 includes curing the material in the barriers by applying ultraviolet (UV) rays and/or heat. The material may be cured to solidify the material and form interlocking elements in the barriers of the rotor lamination stack by exposing the material to ultraviolet (UV) rays and/or heating the material to a pre-determined temperature while the material is in the rotor lamination stack. In this way, interlocking elements in the shape of the first interlocking element, the lateral interlocking element, and the middle interlocking may be constructed. By utilizing specific areas of the barrier or the entire barrier, the time duration for assembling the motor may be decreased since the assembly process does not include a step for inserting the interlocking elements into the barriers. In this way, the efficiency of the motor assembly process may increase. The method 500 then ends.

FIGS. 6 and 7 illustrate rotor lamination stacks 600 and 700 constructed according to the method described in FIG. 4 and FIG. 5 respectively. The rotor lamination stacks 600 and 700 may be an embodiment of the rotor lamination stacks described above with respect to FIGS. 3A-3C and may share at least some of the structural and functional features. Therefore, redundant description of these overlapping features is omitted for concision.

The rotor lamination stacks 600 and 700 may include a magnetic portion 602 comprising a plurality of segments and a non-magnetic portion comprising a plurality of barriers and a plurality of interlocking elements wherein at least one interlocking element is arranged in one or more barriers. FIGS. 6 and 7 include an exploded view of the plurality of interlocking elements. The plurality of barriers may include a first barrier 604a, a second barrier 604b, a third barrier 604c, a fourth barrier 604d, a fifth barrier 604c, and a sixth barrier 604f.

Turning to FIG. 6, the first barrier 604a includes a first peripheral end 606a and a second peripheral end 606b, the second barrier 604b includes a third peripheral end 606c and a fourth peripheral end 606d, the fourth barrier 604d includes a fifth peripheral end 606e and a sixth peripheral end 606f, and the fifth barrier 604c includes a seventh peripheral end 606g and an eighth peripheral end 606h. Additionally, the plurality of interlocking elements may include a first interlocking element 608a, a second interlocking element 608b, a third interlocking element 608c, a fourth interlocking element 608d, a fifth interlocking element 608e, a sixth interlocking element 608f, a seventh interlocking element 608g, and an eighth interlocking element 608*h*. Each interlocking element of the plurality of interlocking element is a lateral interlocking element of various shapes and sizes. As described above, the plurality of interlocking elements may be fabricated according to the method 400 of FIG. 4, wherein solid interlocking elements are fabricated individually. In particular, the lateral interlocking elements may be fabricated with various molds or additive manufacturing. In this way, during manufacturing the plurality of interlocking elements may be positioned within the two peripheral ends of each barrier.

For example, the first interlocking element 608*a* may be positioned within the first peripheral end 606*a* and the second interlocking element 608*b* may be positioned within the second peripheral end 606*b* of the first barrier 604*a*, the third interlocking element 608*c* may be positioned within the third peripheral end 606*c* and the fourth interlocking element 608*d* may be positioned within the fourth peripheral end 606*d* of the second barrier 604*b*, the fifth interlocking element 608*c* may be positioned within the fifth peripheral end 606*e* and the sixth interlocking element 608*f* may be positioned within the sixth peripheral end 606*f* of the fourth barrier 604*d*, and the seventh interlocking element 608*g* may be positioned within the seventh peripheral end 606*g* and the eighth interlocking element 608*h* may be positioned within the eighth peripheral end 606*h* of the fifth barrier 604*c*.

Returning to FIG. 7, the plurality of interlocking elements may include a first interlocking element 702*a*, a second interlocking element 702*b*, a third interlocking element 702*c*, and a fourth interlocking element 702*d*. Each interlocking element of the plurality of interlocking element occupies the entire barrier wherein the interlocking element is arranged in. As described above, the plurality of interlocking elements may be fabricated according to the method 500 of FIG. 5, wherein a liquid compound material is poured into the barrier to fill either an area of the barrier or the entire barrier and cured to solidify the compound material within the barrier. In this way, the barriers of the rotor lamination stack 700 act as a mold for the plurality of interlocking elements. For example, the liquid compound material may be poured into the first barrier 604*a* and cured to form the first interlocking element 702*a*, the liquid compound material may be poured into the second barrier 604*b* and cured to form the second interlocking element 702*b*, the liquid compound material may be poured into the fourth barrier 604*d* and cured to form the third interlocking element 702*c*, and the liquid compound material may be poured into the fifth barrier 604*c* and cured to form the fourth interlocking element 702*d*.

The technical effect of configuring a rotor laminations stack with a plurality of interlocking elements is that torque ripple experienced at high speeds and low speeds during operation of an electric motor while ensuring the mechanical strength of the rotor lamination stack. Additionally, a cost of the stamping molds and lamination may be reduced as a result of a simplified rotor lamination stack configuration.

The disclosure also provides support for an electric motor system, comprising: a rotor lamination stack comprising at least one interlocking element arranged in one or more barriers, the at least one interlocking element being non-metallic and non-magnetic. In a first example of the system, each barrier of the one or more barriers is generally arc-shaped. In a second example of the system, optionally including the first example, each barrier comprises two peripheral ends that extend toward an outer surface of a rotor and a middle portion spaced between the two peripheral ends. In a third example of the system, optionally including one or both of the first and second examples, the middle portion encloses a permanent magnet of a plurality of permanent magnets. In a fourth example of the system, optionally including one or more or each of the first through third examples, a curvature and a width of a barrier varies based on a radial distance between the barrier and the outer surface of the rotor lamination stack, the curvature and width of the barrier decreasing as the radial distance of the barrier from the outer surface decreases.

In a fifth example of the system, optionally including one or more or each of the first through fourth examples, a curvature and a width of a peripheral end of the barrier varies based on a radial distance between a point on the peripheral end and the outer surface of the rotor lamination stack, the curvature of the peripheral end increasing and the width of the peripheral end decreasing as the radial distance between the point on the peripheral end and the outer surface decreases. In a sixth example of the system, optionally including one or more or each of the first through fifth examples, a shape of the at least one interlocking element matches curves and edges of the barrier, enabling the at least one interlocking element to be positioned within the barrier. In a seventh example of the system, optionally including one or more or each of the first through sixth examples, the at least one interlocking element comprises one centered interlocking element, the one centered interlocking element comprising a first interlocking member with a rectangular-shaped cross-section with two parallel, concave sides.

In an eighth example of the system, optionally including one or more or each of the first through seventh examples, the at least one interlocking element comprises two lateral interlocking elements, the two lateral interlocking elements comprising a first lateral interlocking element being positioned at a first peripheral end of the barrier and a second lateral interlocking element being positioned at a second peripheral end of the barrier. In a ninth example of the system, optionally including one or more or each of the first through eighth examples, a lateral interlocking element comprises a second interlocking member with a generally rounded swept wing-shaped cross section with two protruding rounded rectangular-shaped edges disposed toward one end of the second interlocking member relative to another end, the two protruding rounded rectangular-shaped edges being disposed on different sides of the cross-section.

In a tenth example of the system, optionally including one or more or each of the first through ninth examples, the at least one interlocking element comprises three interlocking elements, the three interlocking elements comprising two lateral interlocking elements, and a middle interlocking element comprising a third interlocking member with a rectangular-shaped cross section with two protruding rounded rectangular-shaped edges being disposed at a center of the third interlocking member, the two protruding rounded rectangular-shaped edges being disposed on different sides of the cross-section.

The disclosure also provides support for a method for manufacturing an interlocking element of a rotor lamination stack, comprising: inserting the interlocking element within a barrier of the rotor lamination stack, the interlocking element being fabricated independent of the rotor lamination stack or by employing the rotor lamination stack as a mold to fabricate and position the interlocking element within the barrier, a material of the interlocking element being non-magnetic and non-metal. In a first example of the method, the interlocking element being fabricated independent of the rotor lamination stack comprises fabricating one interlocking element individually with a three-dimensional (3D) printer or one of a plurality of interlocking element molds, each interlocking element mold being separate from the rotor lamination stack and shaped to create a molding of one of a centered interlocking element, a lateral interlocking element, and a middle interlocking element. In a second example of the method, optionally including the first example, the material has high magnetic reluctance. In a third example of the method, optionally including one or both of the first and second examples, employing the rotor lamination stack as a mold to fabricate and position the interlocking element within the barrier comprises: pouring the material in liquid form into the barrier of the rotor lamination stack, curing the material in the barrier by applying ultra-violet rays or heating the material to a pre-determined temperature.

The disclosure also provides support for a motor system, comprising: a rotor comprising a generally cylindrical rotor body with an inner surface and an outer surface, the rotor being arranged from a rotor lamination stack that includes a magnetic portion comprising a plurality of segments and a non-magnetic portion comprising a plurality of barriers and a plurality of interlocking elements wherein at least one interlocking element is arranged in one or more barriers, a stator with a plurality of stator windings electrically coupled to a control circuit of a plurality of circuits including at least one transistor, and an inverter electrically coupled to an electrical power source wherein executable instructions are configured, stored, and executed in at least one memory by at least one processor of the inverter to apply a current to the plurality of stator windings. In a first example of the system, each barrier is generally arc-shaped and comprises two peripheral ends and a middle portion, the two peripheral ends extending toward the outer surface of the rotor.

In a second example of the system, optionally including the first example the plurality of interlocking elements comprises at least one of a centered interlocking element, a lateral interlocking element, or a middle interlocking element arranged within one or more barriers of the plurality of barriers. In a third example of the system, optionally including one or both of the first and second examples, one lateral interlocking element is positioned within a peripheral end of a barrier. In a fourth example of the system, optionally including one or more or each of the first through third examples, one of the centered interlocking element and the middle interlocking element are positioned within a middle portion of the barrier.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for case of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "approximately" and "substantially" are construed to mean plus or minus five percent of the range, unless otherwise specified.

The invention claimed is:

1. A motor system, comprising:
a rotor comprising a generally cylindrical rotor body with an inner surface and an outer surface, the rotor being arranged from a rotor lamination stack that includes a magnetic portion comprising a plurality of segments and a non-magnetic portion comprising a plurality of empty regions and a plurality of interlocking elements wherein each of the plurality of interlocking elements are arranged in a part of one of the plurality of empty regions where a portion of the empty region is adjacent to at least one side of the interlocking element;

a stator with a plurality of stator windings electrically coupled to a control circuit of a plurality of circuits including at least one transistor; and
an inverter electrically coupled to an electrical power source wherein executable instructions are configured, stored, and executed in at least one memory by at least one processor of the inverter to apply a current to the plurality of stator windings.

2. The motor system of claim 1, wherein each of the plurality of empty regions is generally arc-shaped and comprises two peripheral ends and a middle portion, the two peripheral ends extending toward the outer surface of the rotor.

3. The motor system of claim 1, wherein:
the motor system is a synchronous reluctance motor (SRM) system;
the plurality of interlocking elements comprises at least one lateral interlocking element arranged within one or more empty regions of the plurality of empty regions.

4. The motor system of claim 2, wherein one lateral interlocking element is positioned within a peripheral end of an empty region included in the plurality of empty regions.

5. The motor system of claim 3, wherein one of the centered interlocking element and the middle interlocking element are positioned within a middle portion of an empty region included in the plurality of empty regions.

* * * * *